Patented Oct. 31, 1950

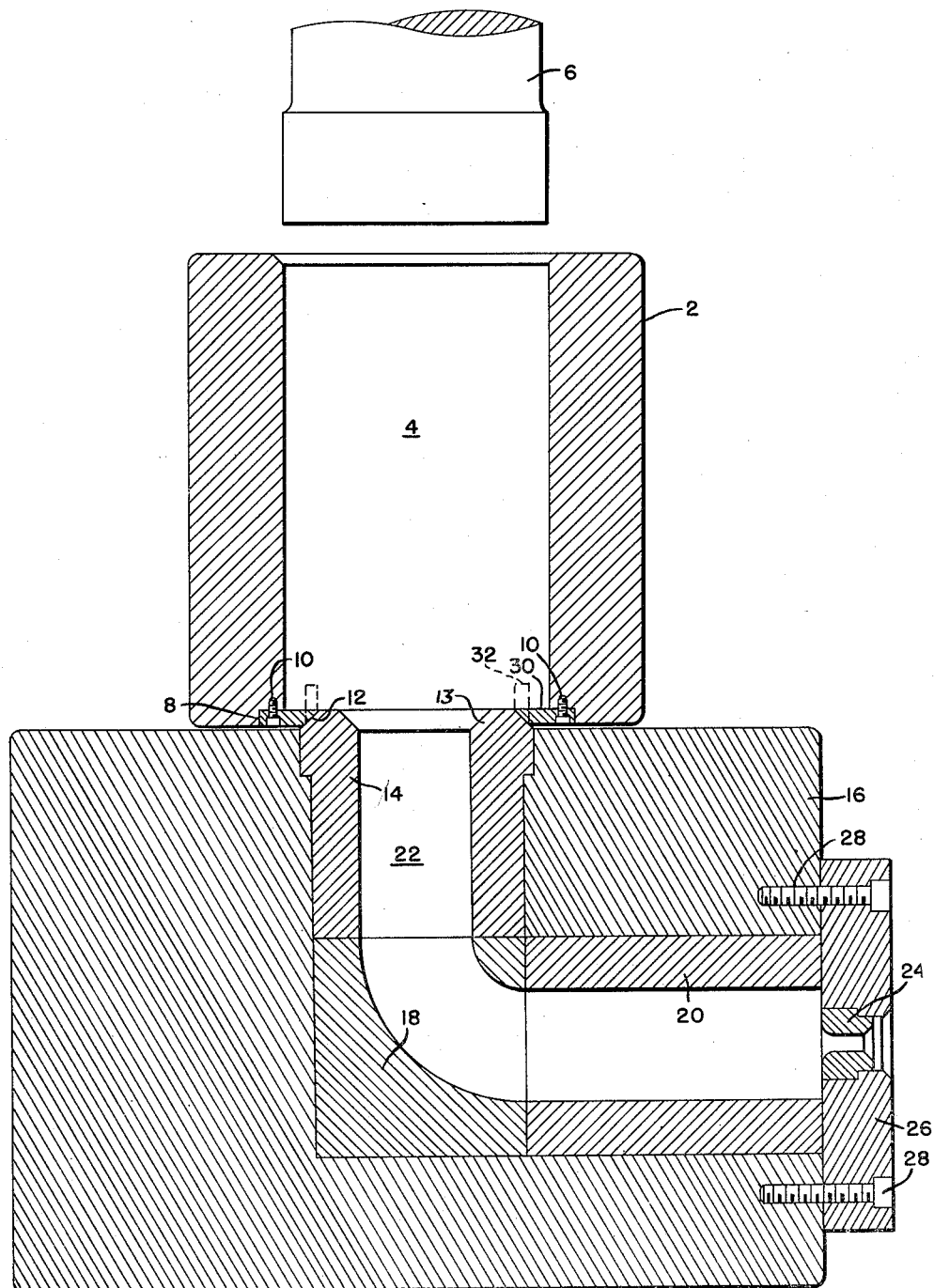

2,528,260

UNITED STATES PATENT OFFICE 2,528,260

EXTRUSION PRESS

Joseph A. Cademartori, Chicago, Ill., assignor to American Steel Foundries, Chicago, Ill., a corporation of New Jersey Application July 5, 1947, Serial No. 759,229

4 Claims. (Cl. 18—12)

This invention relates to sealing means and more particularly to a novel seal in which the pressure retained thereby is effective to maintain the seal in assembled relationship.

A general object of the invention is to design a dependable seal which may be readily connected and disconnected by assembly and disassembly of the parts without the use of clamping devices such as are commonly required.

Another object of the invention is to design a sealing mechanism for a flowable medium wherein the sealed parts are maintained in sealed relationship by the pressure of said medium.

Still another object of the invention is to connect two members having communicating passages by means of a ring secured to one of the members and engaging the other member along a conical surface presenting a projected pressure area substantially less than the internal pressure area of said ring.

The foregoing and other objects and advantages of the invention will become apparent from a consideration of the following specification and the accompanying drawing which is a vertical cross sectional view of an extrusion press embodying the invention, the press ram or punch being fragmentarily shown in elevation.

Describing the invention in detail, the press comprises an extrusion cylinder or container 2 with a cylindrical passage 4 adapted to receive a press ram or punch 6. The cylinder 2 is connected to a sealing ring 8 fitted into a complementary annular recess within the cylinder 2 along closely machined surfaces and tightly secured thereto as by bolts 10 thereby affording a fluid tight connection between the ring 8 and the cylinder 2.

The ring 8 comprises a conical surface 12 facing outwardly from the passage 4 and fitted against a complementary surface of a projection 13 on a bushing 14 fitted within a die yoke 16 which also contains a bushing 18 and a bushing 20. The three bushings are afforded a fluid tight permanent fit within the yoke 16 and may be regarded as an integral part thereof. The bushings are formed with a continuous die passage 22 communicating with a die 24 carried by a die plate 26 having a machined fit with the bushing 20 and the yoke 16 and tightly secured thereto as by bolts 28.

It may be noted that the bushings 14, 18, and 20 are preferably formed of tool steel and the yoke 16 is formed of ordinary cast steel for the purpose of economical construction. However, if desired, the yoke 16 may be formed as a tool steel member containing the passage 22 thereby eliminating the necessity of separable bushings.

The annular pressure area 30 of the ring 8 within the passage 4 is substantially greater than the projected pressure area 32 of the conical surface 12 whereby during compression of a flowable medium, such as graphite within the passage 4 by the ram 6, the pressure against the surface 30 holds the ring 8 tightly seated against the bushing 14 along the conical surface 12.

It may be noted that the conical surface 12 of the ring 8 tapers into the container 2 and defines an opening tapering into the container whereby pressure therein acting on the surface 30, which may be regarded as a seating surface or area inasmuch as pressure thereagainst tightly seats the surface 12 against the complementary surface of the bushing 14, is effective to maintain the conical surfaces in substantially fluid-tight engagement. In this connection it may be noted that the container 2 is freely movable toward the member 16 so that the pressure acting on the seating area 30 is effective to seat the conical surfaces at 12.

It will be understood that between operations of the device, the cylinder 2 is frequently removed and this is accomplished by the simple expediency of lifting the cylinder from the bushing 14, inasmuch as the novel connection between the ring 8 and the bushing 14 is such that the pressure within the passage 4 is effective to maintain the ring and bushing 14 in assembled relationship without the use of clamps, bolts, or other similar securing means.

Thus it will be understood that I have provided a novel seal which may be readily assembled and disassembled and which is so designed that the pressure retained by the seal is effective to maintain the parts thereof in sealed relationship.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In an extrusion press for extruding flowable material under pressure; the combination of a member having a passage adapted to convey said material to an associated die, a container readily separable with respect to said member and adapted to contain said material under pressure for delivery to said passage, a ring carried by said container and having a conical surface defining an opening tapering into the container, a projection on said member extending into said ring and having a conical surface complementary to the first-mentioned surface and seated thereagainst, said passage extending through said projection and communicating with said container, the projected pressure area of said surfaces in said container being less than the internal pressure area of said ring, said container being freely movable toward said member whereby the pressure of said material acting on the last-mentioned area is effective to maintain said conical surfaces in substantially fluid-tight engagement.

2. In an extrusion press for extruding flowable material under pressure; a member having a passage adapted to convey said material to an associated die, a container readily separable with respect to said member and adapted to contain said material under pressure for delivery to said passage, a ringlike member carried by the container and projecting radially inwardly with respect thereto, said ringlike member having a surface defining an opening tapering into the container, a projection on the first-mentioned member extending into said ringlike member and having a surface complementary to the first-mentioned surface and seated thereagainst, said passage extending through said projection and communicating with the interior of said container, the projected pressure area of said surfaces in said container being less than the opposed pressure area of said ringlike member, said container being freely movable toward said first mentioned member whereby the pressure of said material acting on the last-mentioned area is effective to maintain said surfaces in substantially fluid-tight engagement.

3. A device of the class described comprising a container adapted to hold a quantity of flowable material under pressure, a ringlike part carried by the container, a member readily separable from said container having a passage adapted to convey said material therefrom, a projection on said member extending into said part and seated thereagainst along complementary surfaces surrounding said passage and tapering into said container, said part having a seating pressure area therein facing away from said surfaces and being greater than the area said surfaces projected into said container, said container and part being freely movable toward said member whereby pressure of said material on said seating area is effective to maintain said surfaces in fluid-tight engagement.

4. A device of the class described comprising a member having a passage for flowable material under pressure, a container above said member and adapted to contain a supply of said material for delivery under pressure to said passage, said container carrying a ring defining an opening connected to the upper end of said passage, said member projecting into the ring and being seated thereagainst along complementary surfaces around the upper end of said passage, said surfaces tapering into said container, said container being entirely supported by said ring and said ring being entirely supported by said surfaces, said ring having a seating pressure area in said container greater than the projected seating area of said surfaces therein and facing away from the surfaces, the pressure acting on the first-mentioned area being effective to maintain said surfaces in engagement whereby upon release of said pressure on said first mentioned seating area the container may be lifted from engagement with said member.

JOSEPH A. CADEMARTORI.

REFERENCES CITED

The following references are of record in the file of this patent:

UNITED STATES PATENTS

| Number | Name | Date |
| --- | --- | --- |
| 1,768,790 | Royle | July 1, 1930 |
| 2,028,240 | Palmer | Jan. 21, 1936 |
| 2,392,336 | Nissen | Jan. 8, 1946 |

FOREIGN PATENTS

| Number | Country | Date |
| --- | --- | --- |
| 451,466 | Germany | Nov. 1, 1927 |